United States Patent [19]

Hulyalkar et al.

[11] Patent Number: 5,761,088
[45] Date of Patent: Jun. 2, 1998

[54] METHOD AND APPARATUS FOR CHANNEL IDENTIFICATION USING INCOMPLETE OR NOISY INFORMATION

[75] Inventors: Samir N. Hulyalkar, Columbia, Md.; Zhi-Yuan Guan, San Gabriel, Calif.

[73] Assignee: Philips Electronics North America Corporation, New York, N.Y.

[21] Appl. No.: 573,857

[22] Filed: Dec. 18, 1995

[51] Int. Cl.$^6$ .................. G06F 17/00; H04N 7/08
[52] U.S. Cl. .................. 364/514 R; 375/231; 375/224; 375/350; 348/611; 348/614
[58] Field of Search .................. 348/611, 614; 358/336, 340; 375/231, 224, 340, 350; 455/67.1, 67.4; 364/514 R

[56] References Cited

U.S. PATENT DOCUMENTS

| | | | |
|---|---|---|---|
| 4,953,026 | 8/1990 | Kobayashi et al. | 348/611 |
| 5,047,859 | 9/1991 | Koo | 348/611 |
| 5,111,298 | 5/1992 | Koo | 375/231 |
| 5,172,232 | 12/1992 | Koo | 375/231 |
| 5,179,444 | 1/1993 | Koo | 375/231 |
| 5,557,540 | 9/1996 | Miyashita | 364/514 R |
| 5,568,202 | 10/1996 | Koo | 348/611 |

FOREIGN PATENT DOCUMENTS

0480507A2  4/1992  European Pat. Off. .

*Primary Examiner*—Emanuel T. Voehz
*Assistant Examiner*—Bryan Bui
*Attorney, Agent, or Firm*—Edward W. Goodman

[57] ABSTRACT

A method and apparatus for channel identification utilizing two Least-Squares (LS) estimators. Each LS estimator is used for calculating a sequence of channel values, further for determining an estimated channel impulse response, over an entire frequency band thereof in light of the fact that information is incomplete or unreliable over part of the frequency band. Each LS estimator operates for the case when the estimated channel impulse response span is less than the span of a known test signal, the test signal having been transmitted over the channel for use in identifying the channel. In a TV ghost-cancellation system for removal of channel induced distortion from received signals, each LS estimator is used to compute channel impulse response coefficients, wherein the system includes ghost-cancellation filters responsive to the channel impulse response for removing the effects of the channel from the signals.

48 Claims, 5 Drawing Sheets

METHOD AND APPARATUS FOR CHANNEL IDENTIFICATION USING INCOMPLETE OR NOISY INFORMATION

BACKGROUND OF THE INVENTION

1. Field of the Invention

This invention generally relates to a method and apparatus for identifying the characteristics of a communication channel, and more particularly, to a method and apparatus for substantially cancelling echoes (also referred to as "ghosts") which can occur during the transmission of television signals.

2. Discussion of the Related Art

Communication engineering continually must deal with the problem of restoring a signal which has been altered by the communication channel over which the signal was transmitted. Signal restoration often can be achieved if the communication channel is fully characterized, at least as to those parameters which contribute to the signal alteration. Thus, a frequently essential component of the signal restoration problem is that of identifying the characteristics of the communication channel.

Characterization of a channel by its channel impulse response plays a vital role in ghost-cancellation, equalization, and adaptive filter design. In ghost-cancellation for television signals, channel impulse response data are used to develop finite-impulse response (FIR) and infinite-impulse response (IIR) filters to cancel echoes, such as taught for example in U.S. Pat. Nos. 5,047,859 and 5,111,298, assigned to the assignee of the present invention, the disclosures of which are incorporated by reference herein.

It is essential that an estimation error in the channel impulse response be as small as possible to improve overall performance, which may be referred to in terms of both initial acquisition and steady-state tracking. A good survey of the ghost cancellation problem and some theoretical solutions, can be found in W. Ciciora, G. Sgrignoli and W. Thomas, "A Tutorial on Ghost Cancelling in Television Systems," IEEE Trans. Consumer Elect., vol. CE-25, pp. 9–43 (Feb. 1979).

A straightforward approach to the channel identification problem is to transmit a known signal over a desired channel, and to receive the transmitted signal after it has passed through the channel. The known signal however is corrupted by the linear channel and noise. The noise is assumed to be additive white Gaussian noise (AWGN).

The originally transmitted signal is then compared with the received signal, and a model of the channel characteristics is developed based on the comparison. The known signal can also be sent repetitively so that simple averaging techniques can be used to increase the signal-to-noise ratio (SNR) and, perhaps, as an approximation, it can be assumed that the noise is negligible. Characterization of the channel is then possible for the bandwidth of the known transmission signal.

Sometimes other considerations prevent the transmission of the known signal with a bandwidth equal to or greater than the bandwidth of the channel. As a result, complete information of the channel frequency response is not available. For example, a ghost-cancellation-reference (GCR) signal used for analog NTSC ghost-cancellation has a bandwidth of 4.2 MHz. However, an analog-to-digital (A/D) converter used in known receivers for implementing low-cost digital signal processing techniques has a sampling rate of 14.3 MHz, thus effectively considering a channel of 7.15 MHz; wherein the bandwidth of the channel is determined by filters which precede the A/D converter in the receiver. Thus, for an oversampled analog signal, the channel bandwidth is always higher than the bandwidth of the known signal (i.e., corresponding to the GCR signal in our example). In general, such a problem cannot be uniquely solved.

From a practical point of view, the GCR signal has a finite non-zero length which implies that the signal is not strictly band-limited; actually a small amount of energy is also present between the range 4.2 to 7.15 MHz. In the presence of noise, the part of the GCR signal between the range 4.2 to 7.15 MHz becomes extremely unreliable thereby causing inaccuracies in known channel-impulse response estimation methods.

It would thus be desirable to provide a method and apparatus for channel identification which provides an estimation of the channel over the entire frequency band thereof even though information is only reliable over part of the band.

SUMMARY OF THE INVENTION

An object of the present invention is to overcome the problems in the art as discussed above.

Another object of the present invention is to provide a method and apparatus for channel identification which provides an estimation of the channel over the entire frequency band thereof even though information is only reliable over part of the band.

According to the present invention, a method of communication channel identification comprises the steps of transmitting a test signal x over a communication channel to be identified, the test signal x having a signal span. A signal y is received, wherein signal y comprises test signal x after test signal x has passed through and been distorted by the communication channel. A sequence of channel values corresponding to an estimated channel impulse response is calculated, the channel impulse response providing an estimate of the communication channel. The sequence of channel values comprises a sampled discrete channel of a finite number of non-zero indices in an interval defined by [−L, M], wherein the channel impulse response has an impulse respone span equal to M+L, the impulse response span being less than the span of the test signal x. The calculating step further comprises using a least-squares (LS) estimator.

In addition, according to the present invention, an apparatus for communication channel identification comprises a receiving means for receiving a signal y. The signal y comprises a test signal x after test signal x has passed through and been distorted by a communication channel to be identified, test signal x having been transmitted over the communication channel and further having a signal span. A storage means stores a reference test signal $x_{REF}$, wherein the reference test signal $X_{REF}$ comprises the test signal x uncorrupted by the communication channel. Lastly, a calculating means, responsive to the received signal y and the reference test signal $X_{REF}$, calculates a sequence of channel values corresponding to an estimated channel impulse response, the channel impulse response providing an estimate of the communication channel. The sequence of channel values comprises a sampled discrete channel of a finite number of non-zero indices in an interval defined by [−L, M], wherein the channel impulse response has an impulse response span equal to M+L, the impulse response span being less than the span of the test signal x. The calculating means further comprises a least-squares (LS) estimator.

Yet another method according to the present invention comprises removing channel-induced distortion from signals. The method comprises receiving the signals, wherein the signals include a signal y. Signal y comprises a test signal x after test signal x has passed through and been distorted by a communication channel. Test signal x comprises a signal having a signal span. The communication channel is identified in real time, wherein identifying the channel comprises calculating a sequence of channel values corresponding to an estimated channel impulse response. The channel impulse response provides an estimate of the communication channel, wherein the sequence of channel values comprises a sampled discrete channel of a finite number of non-zero indices in an interval defined by $[-L, M]$, wherein the channel impulse response has an impulse response span equal to M+L, the impulse response span being less than the span of the test signal x. Calculating the sequence of channel values further comprises using a least-squares (LS) estimator. Lastly, the received signals are filtered in real time, in response to the sequence of channel values corresponding to the estimated channel impulse response, for removing channel-induced distortion from the signals.

Still another embodiment of the present invention further includes an apparatus for removing channel-induced distortion from signals. The apparatus comprises means for receiving the signals, wherein the signals include a signal y. Signal y comprises a test signal x after test signal x has passed through and been distorted by a communication channel, wherein test signal x has been transmitted over the communication channel and further has a signal span. A storage means is provided for storing a reference test signal $X_{REF}$, wherein the reference test signal $X_{REF}$ comprises a copy of the test signal x uncorrupted by the communication channel. A communication channel identification means, responsive to the received signal y and the reference test signal $X_{REF}$, is provided for identifying the communication channel in real time. The identifying means comprises means for calculating a sequence of channel values corresponding to an estimated channel impulse response, the channel impulse response providing an estimate of the communication channel. The sequence of channel values comprises a sampled discrete channel of a finite number of non-zero indices in an interval defined by $[-L,M]$, wherein the channel impulse response has an impulse response span equal to M+L, the impulse response span being less than the span of the test signal x. The calculating means further comprises a least-squares (LS) estimator. Lastly, a filtering means is provided for filtering the received signals in real time, in response to the sequence of channel values corresponding to the estimated channel impulse response, to remove channel-induced distortion from the signals.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings in which like reference numerals are carried forward, and in which.

DETAILED DESCRIPTION OF THE PREFERRED EMBODIMENTS

For purposes of describing the present invention, a TV ghost-cancellation system has been chosen to demonstrate the power and effectiveness of the present invention.

Accordingly, a ghost-cancellation channel model has been described herein. For the ghost-cancellation channel model, the channel identification method is formulated using LS techniques, according to the present invention and as further described herein below. Furthermore, as will become apparent from the following, experimental results, obtained when using the LS estimators in accordance with the present invention, provide near-optimal channel identification.

The present invention takes into account the following aspects. If the maximum length of the impulse response of the channel is known, then it is possible to develop a channel identification technique which effectively performs an interpolation of the 'reliable' frequency response, obtained using less noisy information, to determine the total channel frequency response. For example, it is known that over a CATV channel, the impulse response length is at most 2 μsec. Also, if the ratio of the impulse-response length to the observation time window (e.g., the interval N+L relating to the sequence of values of the signal y, as defined in Eq. 2, below) is smaller than the ratio of the 'reliable' information band to the total bandwidth, then the interpolation method according to the present invention can be very accurate. The method and apparatus for channel identification in accordance with the present invention incorporates a method based on known least-squares (LS) linear prediction theory, further using known singular-value-decomposition (SVD) techniques. Also, if information about noise characteristics is independently determined, then the problem of interpolation can be reformulated as a generalized LS prediction problem.

Impulse Response Estimators

Figure 2:
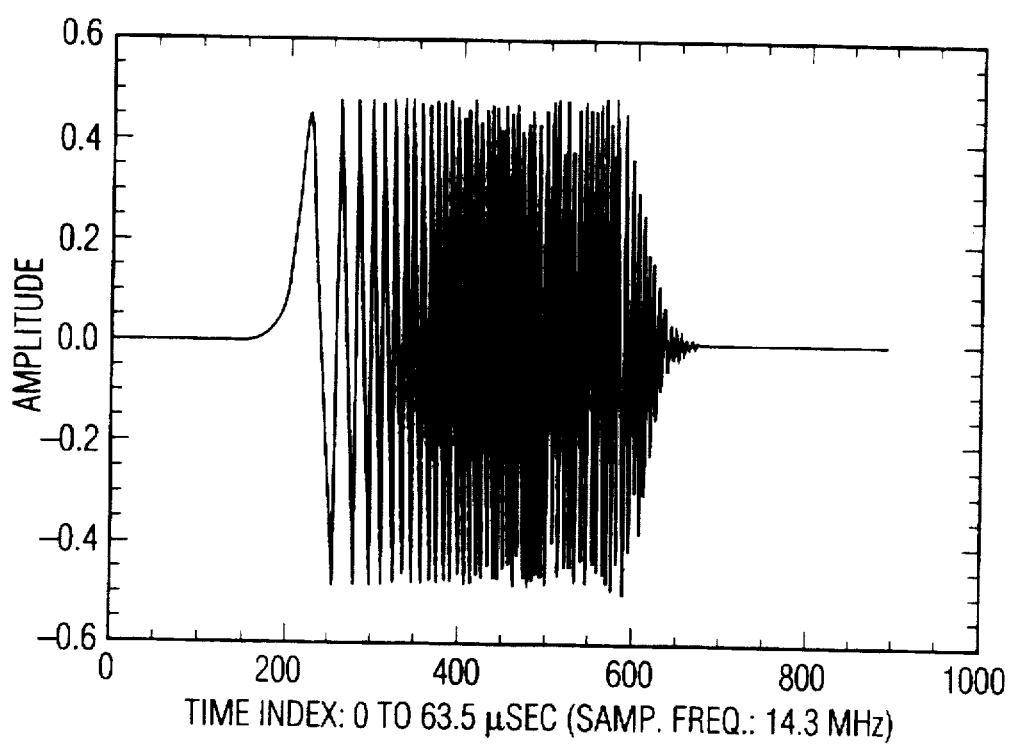
FIG. 2 shows a Koo ghost-cancellation-reference (GCR) signal, used for purposes of describing the present invention.

For NTSC ghost-cancellation, a GCR signal as shown in FIG. 2, known in the art as the Koo GCR, is used, the GCR having properties as described above. This GCR signal is inserted during line 19 in the vertical blanking interval of a transmitted television signal. At the receiver, perfect NTSC timing sync is assumed. This implies that digital signal processing can be used to implement the ghost-cancellation filter. For simplicity, the A/D converter uses a sampling frequency of 14.3 MHz, which is four times the color sub-carrier frequency. Assuming that the channel does not change very rapidly, multiple copies of the corrupted GCR signal are averaged to minimize noise. With a knowledge of the sampled transmitted GCR signal and that of the signal degraded by the channel, the channel identification problem is to determine the impulse response of the channel.

Figure 1A:
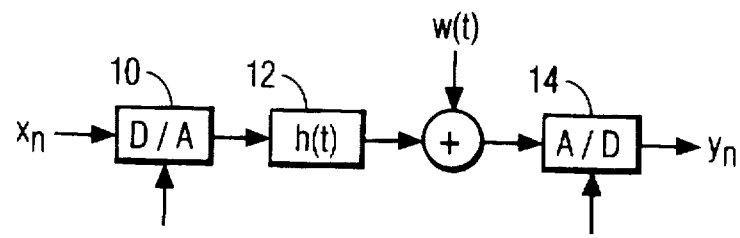
FIGS. 1A and 1B show block diagrams of an actual TV channel signal transmission path as a function of time and the TV channel modeled as a discrete-time channel.
Figure 1B:
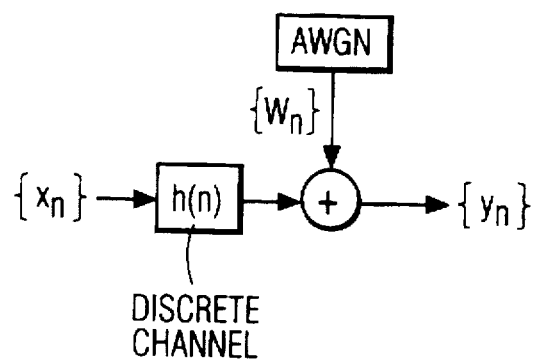

Referring now to FIG. 1A, an illustration of the actual TV channel signal transmission path is shown. Since perfect timing is assumed, the TV channel can be modeled as a general discrete-time channel, as illustrated in FIG. 1B. The method and apparatus in accordance with the present invention are thus not specific to the ghost-cancellation strategy, but can be generalized to any channel modeled as shown in FIG. 1B, with subsequent assumptions.

All sequences (i.e., input, channel, noise and output) have real values for ghost-cancellation. The method described herein below may also be generalized to complex sequences as well. Referring again to FIG. 1A, let us assume that the GCR signal is represented by samples $x_n$, which are then converted into an analog signal by using a digital-to-analog (D/A) converter 10 operating at 14.3 MHz. The analog signal is then operated on by the channel, indicated by reference numeral 12 and characterized by h(t), and further, influenced by additive noise represented by w(t). At the receiver, the received waveform, y(t), is sampled at a frequency of 14.3 MHz using an analog-to-digital (A/D) converter 14. As shown in FIGS. 1A and 1B, samples of the received signal are represented by $y_n \equiv y(nT)$, where T is the sampling interval. If $h_n$, representing a sampled discrete channel, is assumed to be nonzero for a finite number of indices in an interval defined by $-L(t)$, $M(t)$, (i.e., the interval [−LT, MT], or equivalently, in the interval [−L, M]), then $$y(nT) = y_n = \sum_{k=-L}^{P} h_k x_{n-k} + w_n, \quad \text{(EQ 1)}$$

where T is the sampling interval of the A/D converter 14, p=min (n,M), $w_n$ is a noise component, and where it is also assumed that $x_n$ is causal. Hereinafter, the interval [−LT, M7] shall be expressed as the interval [−L, M] for simplicity. If $x_n$ has a finite set of values, for n=0 to (N+L−1), then we can write the following matrix equation $$y_{(N \cdot L) \times 1} = T_{(N \cdot L) \times (M \cdot L)} h_{(M \cdot L) \times 1} + W_{(N \cdot L) \times 1}, \quad \text{(EQ 2)}$$

where the boldface characters y, T, h, w) indicate vectors or matrices with the appropriate sizes as indicated above. Also $$T_{(N+L) \times (M+L)} = \begin{bmatrix} x_0 & 0 & \cdots & 0 \\ x_1 & x_0 & \cdots & 0 \\ \cdot & \cdot & \cdot & \cdot \\ \cdot & \cdot & \cdot & \cdot \\ \cdot & \cdot & \cdot & \cdot \\ x_{M+L-1} & x_{M+L-2} & \cdots & x_0 \\ \cdot & \cdot & \cdot & \cdot \\ \cdot & \cdot & \cdot & \cdot \\ \cdot & \cdot & \cdot & \cdot \\ x_{N+L-1} & x_{N+L-2} & \cdots & x_{N+L-M} \end{bmatrix}, \quad \text{(EQ 3)}$$

with $$h_{(M \cdot L) \times 1} = (h_{-L}, h_{-L-1}, \ldots, h_{M-1})^T,$$

$$h_{(N \cdot L) \times 1} = (h_{-L}, h_{-L-1}, \ldots, h_{N-1})^T,$$

and a similar definition of $W_{(N+L) \times 1}$. The problem of channel identification is then to find an estimate, ĥ, such that the p-th norm of the error in estimation, $\|h - \hat{h}\|_p$ is minimized. The estimator is assumed herein to be linear with p=2. Note that for ghost cancellation, it might be desirable to choose the 'max' norm or set p=∞. This formulation is similar to that described in the deconvolution method of channel identification, such as described in U.S. Pat. Nos. 5,047,859 and 5,111,298, except here the impulse response length is assumed to be known a priori and to be smaller than the length of the reference signal $x_n$. For example, it is known that over a CATV channel, the impulse response span is at most 2 μsec. For practical applications, this simplifies the problem of channel identification enormously.

As described earlier, the sequence $x_n$ is band-limited to a fraction of the (−π,π) band. To be precise, if $x_n$ has finite support, then the energy in the band outside the bandwidth occupied by $x_n$ would be very small, but not zero. This implies that information about the channel outside this band would be corrupted by noise. The effects of this can be removed by some simple non-linear processing techniques, as will be described below. To describe the impulse response estimators according to the present invention, we will first assume that noise is zero, that is, when noise is absent.

A. WHEN NOISE IS ABSENT

When w=0, (EQ 2) is thus a problem of linear prediction and a LS solution, corresponding to a first estimator, is given by $$\hat{h}_A = T^\dagger y, \quad \text{(EQ 4)}$$

where $T^\dagger$ is a Moore-Penmore (approximate) inverse of T. Using a singular-value-decomposition (SVD) of T, this inverse can be computed as follows. Let $$T = USW^T, \quad \text{(EQ 5)}$$

where U and W are orthogonal matrices and S is a diagonal matrix with elements $\{s_i\}$, which are the singular values of T (that is, they are the eigenvalues of $T^T T$). Then $$T^\dagger = WS^\dagger U^T, \quad \text{(EQ 6)}$$

where $$(S^\dagger)_{ij} = \begin{cases} \left(\dfrac{1}{s_i}\right), & \text{for } s_i \neq 0, \text{ and } i = j, \\ 0, & \text{otherwise.} \end{cases} \quad \text{(EQ 7)}$$

Another approach to solving (EQ 2) is by the use of normal equations involving matrix computations and known methods for solving least-squares problems. For example, these equations can also be obtained by solving the LS problem given by $$T^T y = T^T T h. \quad \text{(EQ 8)}$$

Hence, a second estimator is given by $$\hat{h}_B = (T^T T)^\dagger T^T y. \quad \text{(EQ 9)}$$

Both estimators, $\hat{h}_A$ and $\hat{h}_B$, are equivalent if infinite precision is used to represent all quantities. Using (EQ 5), $$T^T T = W S U^T U S W^T = W S^2 W^T.$$ (EQ 10)

Thus $$(T^T T) T^\dagger = (W(S^2)^\dagger W^T)(W S U^T) = W(S^2)^\dagger S U^T = W S^\dagger U^T = T^\dagger.$$

However, when finite precision is used, the two estimators, $\hat{h}_A$ and $\hat{h}_B$, have different behaviors. Any perturbations in the matrix representation (for example, because of numerical precision) is measured by a bound on the normalized error defined as the norm of the error, $\|h-\hat{h}\|$, divided by $\|h\|$. Using known matrix theory methods, the normalized error for $\hat{h}_A$ is proportional to the quantity $\kappa(T)+\rho(\hat{h}_A)\rho(T)^2$, where $\rho(T)$ is the condition number of T (defined as the ratio of the largest and the smallest non-zero singular values of T) and $\rho(\hat{h})=\|T\hat{h}-y\|$ is the residual error for an incorrect estimate $\hat{h}$. For $\hat{h}_B$, the normalized error is proportional to $\kappa(T)^2$. Hence, when $\rho(\hat{h}_A)$ is small, then estimator $\hat{h}_A$ provides a better estimate than estimator $\hat{h}_B$.

B. WHEN NOISE IS PRESENT

If w is assumed to have zero-mean, independent, and identically distributed components (i.e., the covariance matrix is equal to $\sigma^2 I$, where I is the identity matrix), then the LS estimators $\hat{h}_A$ and $\hat{h}_B$ can be shown to also be the best linear unbiased estimates as determined based upon known adaptive filter theory. If w is also Gaussian, then the LS estimates achieve the Cramer-Rao lower bound for unbiased estimators. Thus LS estimators, $\hat{h}_A$ and $\hat{h}_B$, are optimal for 'white' Gaussian noise.

From the expressions provided for normalized error in the previous section, estimator $\hat{h}_B$ is relatively insensitive to the variance of the additive noise. Since $\rho(\hat{h}_A)$ corresponds to the noise variance, note that for large values of $\sigma^2$, estimator $\hat{h}_B$ may be a better estimator compared to $\hat{h}_A$. This is observed in the experiments described subsequently herein.

When w is not white, which could be the case when the received signal is first passed through a filter before the channel identification process is initiated, a generalized LS problem can be formulated as follows. Let w have zero mean and a symmetric covariance matrix $\sigma^2 K$ such that $K=B\ B^T$ for some B, which could be calculated or known (for example, B could be a matrix similar to T with the exception that now the filter impulse response coefficients would be the entries in B, wherein the filter is at the receiver). It is then possible to write $w=Bv$, where $v$ is white. If B is nonsingular, then (EQ 2) can be rewritten as $$B^{-1}y = B^{-1}Th + v,$$ (EQ 11)

which can now be solved since $v$ is white. If B is singular, then the generalized LS problem is formulated as $$\min_{y = Th + Bv} v^T v.$$ (EQ 12)

A simple method of solving (EQ 12) is to represent B by its SVD $U_B S_B W_B^T$ and then rewriting $y-Th+Bv$ as $$S_B^\dagger U_B^T y = S_B^\dagger U_B^T T h + W_B^T v$$ (EQ 13)

Since $W_B^T$ is orthogonal, $W_B^T v$ is also white ($E W_B^T v v^T W_B = \sigma^2 I$). Thus the generalized LS problem in (EQ 12) is solved. A more elegant solution is obtained by constructing a quotient SVD of both the matrices T and B using orthogonal matrices $W_T$ and $W_B$, and a nonsingular matrix P, such that $T = P^{-1} S_T W_T^T$ and $B = P^{-1} S_B W_B^T$ with pseudo-diagonal matrices $S_T$ and $S_B$. It is possible to define an approximate left inverse of $S_B$ and thus $$S_B^\dagger P y = S_B^\dagger S_T W_T^T h + W_B^T v,$$ (EQ 14)

which is simpler than (EQ 13).

EXPERIMENTAL RESULTS

To test the effectiveness of the estimators, $\hat{h}_A$ and $\hat{h}_B$, discussed herein above, the following set of experiments were carried out. The channel identification problem in ghost-cancellation was considered. The matrix T was generated using the Koo GCR signal shown in FIG. 2. Every sample in FIG. 2 represents a time interval of 1/14.3 μsec. Furthermore, the GCR signal has a 3 dB bandwidth of 4.15 MHz.

If the GCR signal were sent over a CATV channel, it is known that the impulse response length is at most 2 μsec. This implies that the span (or impulse response length) M+L, defined in (EQ 2), is about 28, since the interval MT-(-LT)≧2 μsec, and T=1/14.3 μsec. In the following, the GCR signal was passed through a multipath channel and the results of the first and second estimators, $\hat{h}_A$ and $\hat{h}_B$, given by (EQ 4) and (EQ 9), respectively, were studied in different scenarios. Additionally, the error was defined to be the squared-estimation error (SE), $\|h-\hat{h}\|^2$, in dB scale.

Figure 3:
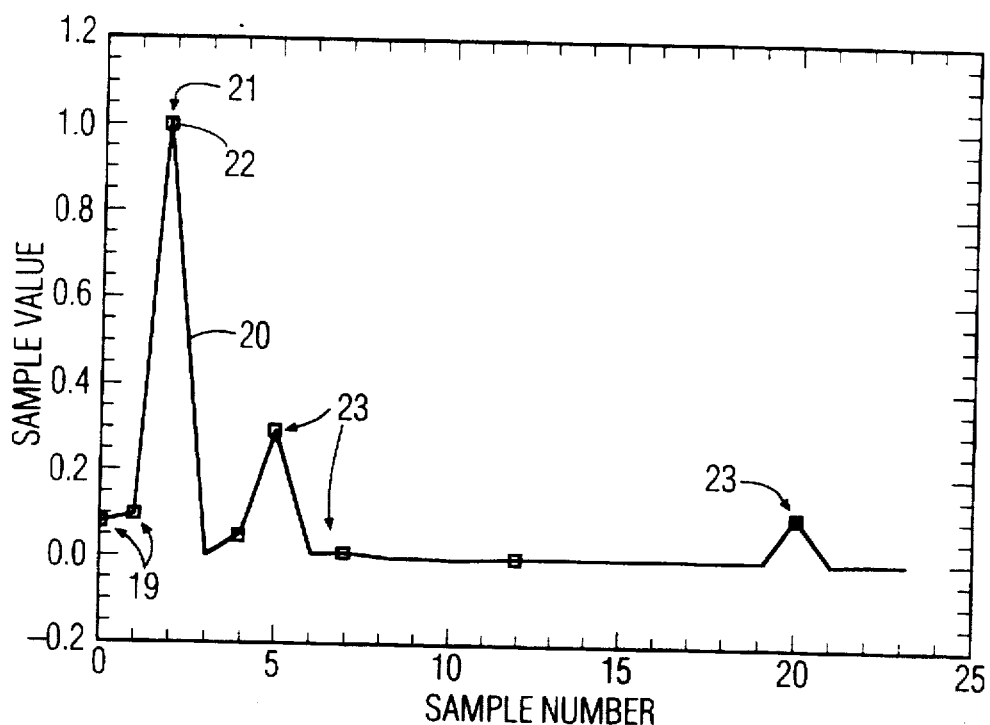
FIG. 3 shows an impulse response for illustrating the performance of the channel interpolation technique corresponding to a first estimator in accordance with the present invention.

Referring now to FIG. 3, the impulse response obtained using the first estimator $\hat{h}_A$ in the presence of no noise and with M+L equal to 24 is shown. In FIG. 3, the estimated channel impulse response is shown by the solid line 20. Also shown with 'square' symbols 22 are the expected impulse-response values. With respect to FIG. 3, it is noted that the estimator provides discrete values (i.e., points on the graph) and that the solid line 20 has been drawn for clarification purposes to demonstrate the results of the estimator as compared to the actual expected impulse response values. In addition, the estimated channel impulse response corresponds to values of $h_n$ at different times, further corresponding to respective sample numbers. FIG. 3 is thus a graph of a sequence of coefficients derived using the first estimator $\hat{h}_A$. It is noted that there are two pre-echoes identified by reference numeral 19 in the multipath response, wherein the pre-echoes make characterization of the channel more difficult. Pre-echoes 19, as shown from left to right, correspond to values of $h_n$ equal to $h_{-2}$ and $h_{-1}$, respectively. The main coefficient of the estimated channel impulse response, corresponding to $h_n$ equal to $h_o$, is identified by the reference numeral 21. In addition, post-echoes also occurred in the estimated channel impulse response, as indicated by the reference numeral 23. As can be observed from FIG. 3, the correspondence between the estimated and expected impulse-response is very close; the measured SE was found to be −58.1 dB.

Figure 4:
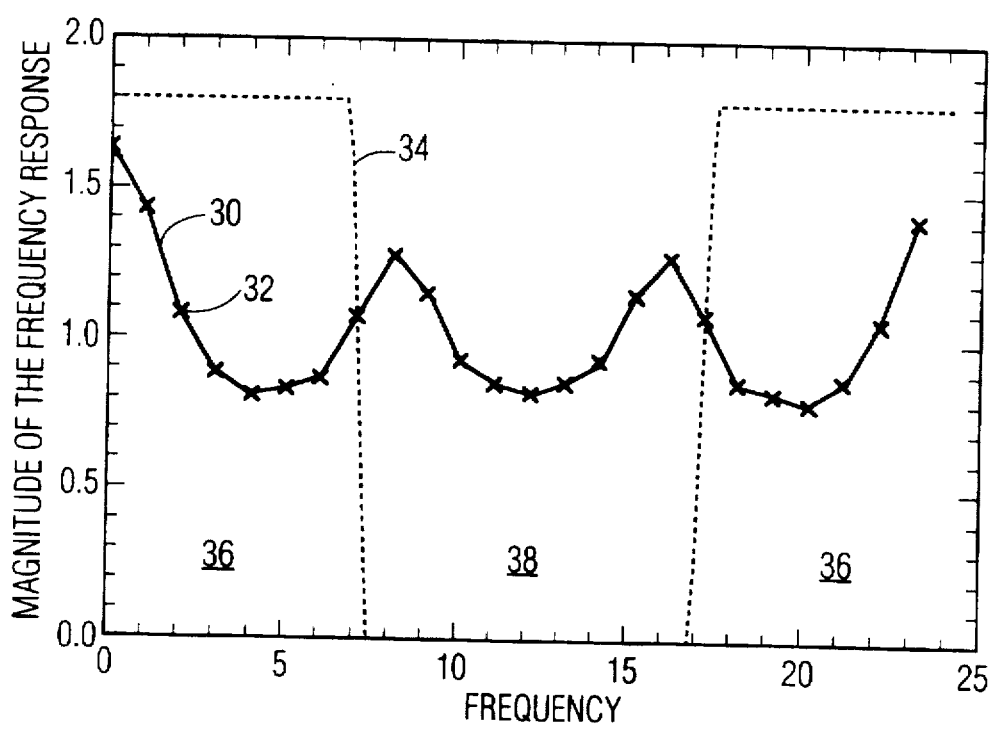
FIG. 4 shows a frequency response of the impulse response of FIG. 3, for further illustrating the performance of the channel interpolation technique corresponding to a first estimator in accordance with the present invention.

Referring now to FIG. 4, there is shown the corresponding frequency response of the impulse response of FIG. 3. In FIG. 4, the estimated channel frequency response is shown by the solid line 30. Furthermore, the 'x' symbols 32 in FIG. 4 specify the expected magnitude of the frequency response computed from the known channel impulse response. FIG. 4 also shows the magnitude of the frequency-response of an idealized GCR, as shown by the dotted line 34. With respect to the GCR signal, part of the spectrum comprises reliable information (as identified by reference numeral 36 in two places) and part of the spectrum comprises unreliable information (as identified by reference numeral 38). The region of the GCR signal identified by reference numeral 38 contains extremely low energy (i.e., non-zero) and is considered unreliable.

Figure 5:
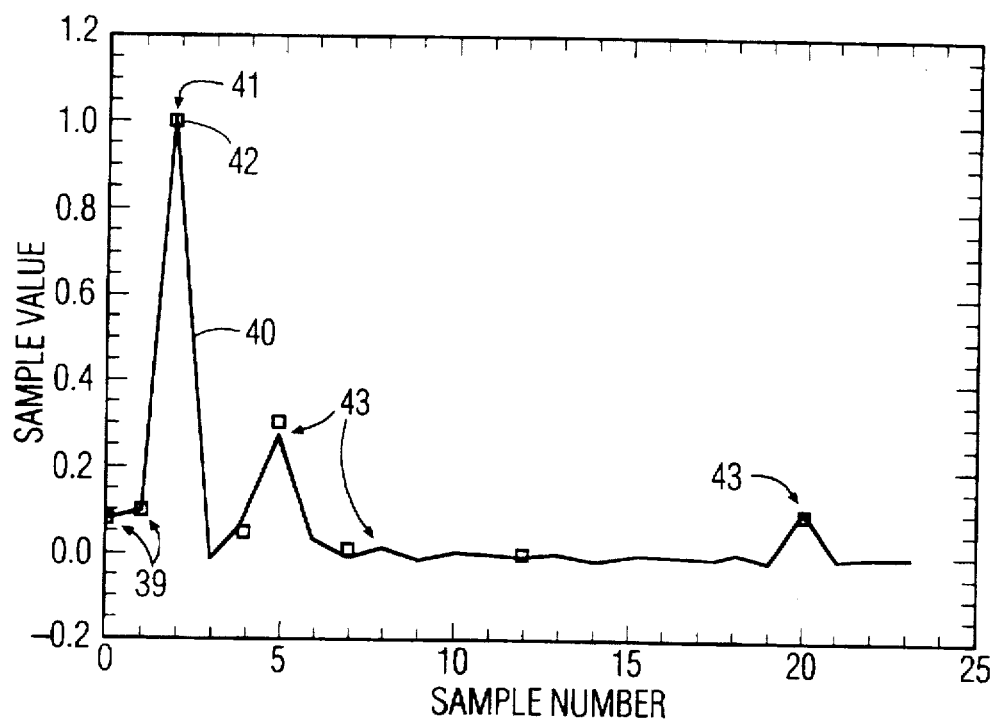
FIG. 5 shows an impulse response for illustrating the performance of the channel interpolation technique corresponding to a second estimator in accordance with the present invention.
Figure 6:
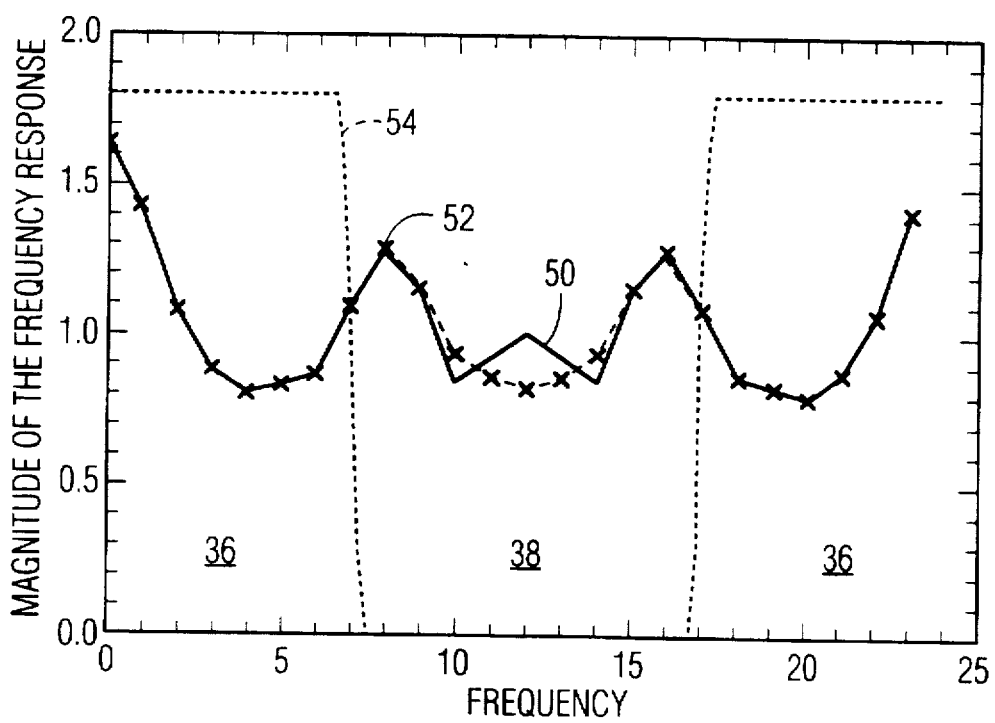
FIG. 6 shows a frequency response of the impulse response of FIG. 5, for further illustrating the performance of the channel interpolation technique corresponding to a second estimator in accordance with the present invention.

FIGS. 5 and 6 show the impulse response and the magnitude of the frequency response for the second estimator, $\hat{h}_B$, for M+L equal to 24. Since sensitivity of this second estimator to numerical precision is higher, some small singular values of $T^T T$ were set to zero (all experiments were carried out using single-precision floating point calculations). As a result, the impulse response is slightly degraded as shown in FIG. 5, wherein the estimated channel impulse response is shown by the solid line 40. With respect to FIG. 5, it is noted that the estimator provides discrete values (i.e., points on the graph) and that the solid line 40 has been drawn for clarification purposes to demonstrate the results of the estimator as compared to the actual expected impulse response values. The 'x' symbols 42 specify the expected impulse response values.

FIG. 5 is thus a graph of a sequence of coefficients derived using the second estimator $\hat{h}_B$. It is noted that there are two pre-echoes identified by reference numeral 39 in the multipath response. The main coefficient of the estimated channel impulse response, corresponding to $h_n$ equal to $h_o$, is identified by the reference numeral 41. In addition, post-echoes also occurred in the estimated channel impulse response, as indicated by the reference numeral 43. Referring still to FIG. 5, note also that a slight wiggle occurs in solid line 40 between the range of sample numbers from 6 to 19, which is indicative that the estimator is different from zero.

The corresponding estimated channel frequency response of the impulse response of FIG. 5 is shown in FIG. 6, illustrated by the solid line 50. The dot-dash line joining the 'x' symbols 52 specify the expected magnitude of the frequency response computed from the known channel impulse response. FIG. 6 also shows the magnitude of the frequency-response of the idealized GCR as shown by the dotted line 54. It is interesting to note that the singular values that were truncated to zero caused errors in the frequency response in the region where the GCR energy is very small, as can be seen from FIG. 6, between 7.4 and 16.6 frequency units, corresponding to the unreliable information region identified by reference numeral 38. In other words, the estimated response does not equal the expected response; rather, the estimated response deviates slightly from the expected response.

The number of singular values that were set to zero to obtain FIGS. 5 and 6 was found by truncating an increasing number of smallest singular values, until the least SE was found. For M+L equal to 24, Table 1, set forth herein below, shows that the best SE performance is obtained by truncating the smallest four singular values. These four singular values were found to be less than $1\times10^{-4}$ (hereinafter expressed as 1e-4). Also, it is not critical as to how the approximate inverse to $T^T T$ is calculated. For example, the inverse could be calculated using the SVD of $T^T T$. It is noted that the method of calculating the inverse using the SVD of $T^T T$ was the method used to calculate the estimator $\hat{h}_B$, described by (EQ 9) for this and subsequent calculations. Alternatively, the inverse could be calculated by using the singular values of T and (EQ 10). For both cases, the results showed that four singular values need to be truncated to obtain the minimum SE. In general, if the span or impulse response length M+L is known (or upperbounded), then such a technique as described herein can be used to determine an optimal number of truncated values. If, instead, M+L is made variable at the receiver, then the number of such truncated values can be obtained with less complexity by alternate non-linear least squares techniques known in the art.

TABLE 1

SE Performance of Estimator $\hat{h}_B$ for Different Numbers of Truncated Values.

| No. of Truncated SVD Values | SE in dB |
|---|---|
| 0 | −6.83 |
| 1 | −6.8 |
| 2 | −7.34 |
| 3 | −7.66 |
| 4 | −24 |
| 5 | −16.5 |

One way to avoid choosing different values of M+L is by using a conservative upper-bound to the channel impulse response. It is then of interest to determine if the LS estimators are sensitive to the choice of M+L. Accordingly, for the same multipath channel, the value of M+L was changed and the SE calculated for the two estimators, $\hat{h}_A$ and $\hat{h}_B$ as outlined in Table 2. For the second estimator, $\hat{h}_B$, described by (EQ 9), all singular values less than 1e-4 were set to zero. Referring still to Table 2, note the robustness in performance even when the assumed span is more than twice that of the actual impulse response span (i.e., note that the change in SE in dB over the range of different values of M+L does not change more than 14 dB with respect to −58.12 dB). From Table 2, we see that in using the estimators, $\hat{h}_A$ and $\hat{h}_B$, we are able to advantageously obtain an estimation of the channel over the entire frequency band even though information is only reliable over part of the frequency band. Furthermore, from Table 2, we can see that in the absence of noise, the first estimator $\hat{h}_A$ provides an SE performance which is always better than the SE performance of second estimator $\hat{h}_B$.

TABLE 2

SE Performance for Estimators $\hat{h}_A$ and $\hat{h}_B$ for Different Assumed-Impulse-Response Spans.

| Value of M + L | SE for $\hat{h}_A$ in dB | SE for $\hat{h}_B$ in dB |
|---|---|---|
| 24 | −58.12 | −24 |
| 28 | −47.7 | −19.2 |
| 32 | −47.3 | −20.6 |
| 36 | −45.8 | −18.9 |
| 40 | −43.2 | −20.44 |
| 44 | −45.2 | −19.99 |
| 48 | −44 | −20.07 |

Next, experiments were carried out to test the performance in the presence of noise. For a given SNR, defined by $$SNR = 10 \log \frac{\frac{1}{N}\sum_{1}^{N} x_i^2}{\sigma^2}, \qquad \text{(EQ 15)}$$

the noise variance $\sigma^2$ can be calculated. Gaussian random numbers with zero mean and variance $\sigma^2$ were added to the output of the simulated channel before estimating the channel impulse-response coefficients. Since different sets of noise sample vectors result in different impulse-response coefficients with different SE, the maximum squared-estimation error SE obtained for a set of 20–30 noise sample vectors is reported in Table 3. For the second estimator, $\hat{h}_B$, the number of truncated SVD values was four for all cases. For the first estimator, $\hat{h}_A$, two sets of cases were considered. For the first set, all singular values were used. For the second set, an optimum number of smallest singular values, shown in parenthesis in the third column in Table 3, were truncated to zero.

TABLE 3

Maximum Performance Obtained Among a Set of 20–30 Randomly Generated Noise Vectors With the Specified SNR for Estimators $\hat{h}_A$ and $\hat{h}_B$.

| SNR in dB | SE for $\hat{h}_A$ - No Truncation - in dB | SE for $\hat{h}_A$ - Truncated Singular Values - in dB | SE for $\hat{h}_B$ in dB |
|---|---|---|---|
| ∞ (No noise) | −58.12 | −58.12 (No truncation) | −24 |
| 60 | −13.5(−18.55) | −15 (2 truncated values) | −23.89 |
| 40 | 7.4 | −18.1 (4 truncated values) | −18.8 |
| 30 | 19.3 | −8.12 (4 truncated values) | −11 |

An intuitive explanation for the performance of the two estimators in the presence of noise is as follows. The first estimator, $\hat{h}_A$, tries to use information present in all the singular values, or in other words, the information present in the entire digital spectrum of the GCR signal. However, the signal is attenuated enormously in the range of 4.2 to 7.15 MHz (corresponding to the range of approximately 7.4 to 16.6 as shown in FIG. 4 and as expressed in units of normalized frequency) and noise in this region degrades the performance for low SNR. If a prescribed number of singular values (i.e., the smaller singular values) which correspond to information in the region of 4.2 to 7.15 MHz are truncated, which corresponds to ignoring information in this region, then improved performance is obtained. See, for instance, the SE for $\hat{h}_A$ in Table 3 for SNR of 40 dB, wherein the SE for $\hat{h}_A$ is −18.1 dB with 4 truncated values, further wherein the later correlates to a better SE performance than the SE for $\hat{h}_A$ of 7.4 with no truncation. The first estimator thus advantageously provides an estimation of the channel impulse response over the entire frequency band in light of the fact that less than the entire digital spectrum of the GCR signal is available, i.e., information is incomplete or unreliable over part of the spectrum. The second estimator, $\hat{h}_B$, is more robust to the influence of noise since the smaller singular values have been made much smaller and are ignored. Note that this later result with respect to the second estimator was expected based on the discussion provided herein above at the end of section A and the beginning of section B.

In all cases, the multipath channel was chosen to be the same for comparison purposes. Similar behavior was obtained for a variety of different multipath channels.

Implementation

When the impulse-response span M+L is small compared to the span of the GCR signal, then the second estimator, $\hat{h}_B$, described in (EQ 9) has considerable advantage in terms of implementation. Because T is Toeplitz and $T^TT$ is symmetric, the total number of sample values that must be stored at the receiver to implement the two matrix multiplications are $$\frac{(M+L)(M+L+1)}{2} + N. \quad \text{(EQ 16)}$$

For ghost-cancellation over a CATV channel, the impulse response span (M+L) equals 28 and N equals 564, where N corresponds to a prescribed number of samples of the GCR signal. Using (EQ 16), this implies a total of 970 sample values (i.e., 406+564=970) considering only the non-zero values of the Koo GCR signal as shown in FIG. 2.

Figure 7:
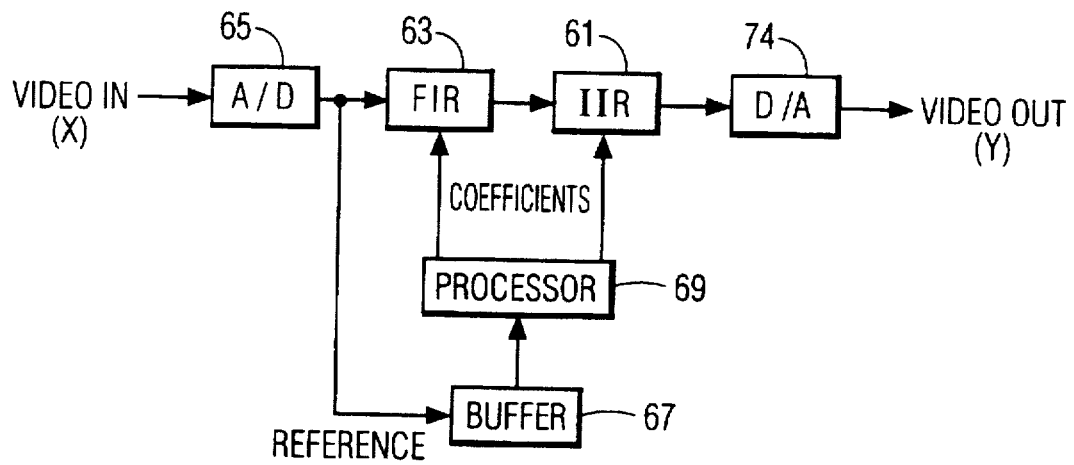
FIG. 7 is a block diagram of an embodiment of an echo cancellation circuit in accordance with the present invention.

FIG. 7 further illustrates a general ghost-cancellation system as will be described further herein below. In operation, the two matrix multiplications of (EQ 9), for determining estimator $\hat{h}_B$, can be implemented in software in digital signal processor (DSP) 9 using standard software library routines. In addition, suitable algorithms for multiplication of a symmetric matrix with a vector, as known in the art, may also be used. Note that (M+L)*(M+L−1)/2 values are zero in T, which simplifies the implementation of the multiplication of the Toeplitz matrix T with the received signal vector.

Ghost Cancellation

Normally there are two main steps involved in cancelling echoes which occur during the transmission of television signals. First, the characteristics of the communication channel (which include the echo artifacts, if any) are determined at the receiver in accordance with the method and apparatus of the present invention, corresponding to estimators $\hat{h}_A$ and $\hat{h}_B$. From these characteristics, an inverse channel characteristic is determined in the form of a sequence of filter coefficients. These coefficients are then provided to filters which are used to implement the inverse channel processing, i.e., the echo cancellation.

A received video signal contains echoes which are comprised of superimposed copies of the originally transmitted signal, which have different delay times and amplitudes. The strongest signal component represents the originally transmitted or main signal component. Looking in the time domain, any echo component occurring before the main signal component is called a "pre-echo" and any copy occurring after the main signal component is called a "post-echo".

FIG. 7 describes an echo cancellation circuit which can be used to cancel both types of echoes. An IIR filter 61 is used to cancel post-echoes and an FIR filter 63 is used to cancel pre-echoes.

Figure 8:
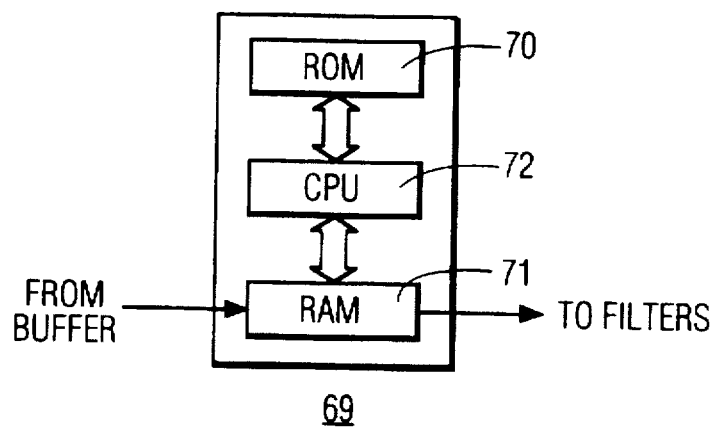
FIG. 8 is a schematic diagram of a processor circuit for computing values of a communication channel impulse response according to the present invention.

Video samples are received and input to an analog-to-digital (A/D) converter 65 and a test signal commonly known as the ghost cancellation reference (GCR) signal which is transmitted during the vertical blanking interval of a television signal, is separated and fed to a buffer memory 67. This reference signal, which has been distorted according to the channel characteristics, is sometimes sampled over a number of frames, and an average of the sampled versions is then fed to processor 69 which is shown in more detail in FIG. 8. Read-Only Memory (ROM) 70 contains a preprocessed and stored version of the GCR as transmitted, and the contents of buffer 67 are compared to the stored version of the GCR from ROM 70 in CPU 72, and from this comparison, the impulse response of the channel can be determined using the estimators, $\hat{h}_A$ and $\hat{h}_B$, in accordance with the present invention, and further for computing a sequence of coefficients for the filters 61 and 63.

For purposes of describing the invention, the Koo GCR signal was used, as shown in the time domain in FIG. 2. This GCR is the signal as transmitted and stored in ROM 70 and/or a processed version of which is stored in ROM 70. While the invention has been described with reference to using the Koo GCR signal, it is to be understood that the instant invention can be practiced with any other type of test reference signal which eventually might be chosen as a standard.

After the filter coefficients are fed to the filters 61 and 63, the complete television signal is processed through these filters where the echo components are substantially reduced. The output of the IIR filter 61 is then fed to a digital-to-analog converter (D/A) 74 and thereafter presented as a video output signal.

Conclusions

Near-optimal methods of channel identification have thus been described herein which utilize information regarding the impulse-response span of the channel.

According to the present invention, least squares methods were used for developing first and second estimators, $\hat{h}_A$ and $\hat{h}_B$, and wherein the impulse-response span was smaller than that of the GCR signal span. The first estimator, $\hat{h}_A$, was shown to have an SE performance close to the ideal when noise was absent. However, in the presence of noise, the SE performance of the first estimator, $\hat{h}_A$, fell quite drastically. The second estimator, $\hat{h}_B$, demonstrated the effects of numerical precision in the situation when noise was absent (i.e., without truncating the singular values of less than 1e-4 as shown in Table 1), thus causing the SE performance to be inferior in the absence of noise. However, the SE performance of the second estimator, $\hat{h}_B$, is better in the presence of noise.

The second estimator, $\hat{h}_B$, furthermore, has an added advantage of easier real-time implementation, especially in the case when the impulse-response span M+L is much smaller than the GCR signal span. The second estimator, $\hat{h}_B$, can thus be effectively used for channel identification as part of TV ghost-cancellation.

In either case, using the estimators, $\hat{h}_A$ and $\hat{h}_B$, we are able to advantageously obtain an estimation of the channel over the entire frequency band thereof in light of the fact that information is incomplete or unreliable over part of the frequency band. In other words, an estimation of the channel over the entire frequency band is able to be obtained even though information used in obtaining the estimation is reliable over a part of the frequency band.

While the invention has been particularly shown and described with reference to the preferred embodiment thereof, it will be understood by those skilled in the art that various changes in form and detail may be made therein without departing from the spirit and scope of the invention.

What is claimed is:

1. A method of communication channel identification comprising the steps of:

transmitting a test signal x over a communication channel to be identified, the test signal x having a signal span;

receiving a signal y, wherein signal y comprises test signal x after test signal x has passed through the communication channel; and calculating a sequence of channel values corresponding to an estimated channel impulse response, the channel impulse response providing an estimate of the communication channel, wherein the sequence of channel values comprises a sampled discrete channel of a finite number of non-zero indices in an interval defined by [−L, M], wherein the channel impulse response has an impulse response span equal to M+L, the impulse response span being less than the span of the test signal x, wherein said step of calculating the sequence of channel values further comprises using a least-squares (LS) estimator.

2. The method of communication channel identification according to claim 1, wherein calculating the sequence of channel values still further comprises using a least-squares (LS) estimator $\hat{h}_A$ given by $$\hat{h}_A = T^{\dagger} y,$$

where $T^{\dagger}$ is a Moore-Penmore (approximate) inverse of T and T is a Toeplitz matrix given by $$T_{(N+L)\times(M+L)} = \begin{bmatrix} x_0 & 0 & \cdots & 0 \\ x_1 & x_0 & \cdots & 0 \\ \cdot & \cdot & \cdot & \cdot \\ \cdot & \cdot & \cdot & \cdot \\ \cdot & \cdot & \cdot & \cdot \\ x_{M+L-1} & x_{M+L-2} & \cdots & x_0 \\ \cdot & \cdot & \cdot & \cdot \\ \cdot & \cdot & \cdot & \cdot \\ \cdot & \cdot & \cdot & \cdot \\ x_{N+L-1} & x_{N+L-2} & \cdots & x_{N+L-M} \end{bmatrix},$$

further wherein $x_n$, for n=0 to (N+L−1), is a finite sequence of sampled values of a reference test signal $X_{REF}$, wherein the reference test signal $X_{REF}$ comprises the test signal x uncorrupted by the communication channel, further wherein N equals the number of sampled values of the finite sequence of $x_n$, and still further wherein y is a finite sequence of sampled values of the received signal.

3. The method of communication channel identification according to claim 1, wherein calculating the sequence of channel values still further comprises using a least-squares (LS) estimator $\hat{h}_B$ given by $$\hat{h}_B = (T^T T)^{\dagger} T^T y,$$

where $(T^T T)^{\dagger} T^T$ is approximately equal to $T^{\dagger}$, wherein $T^{\dagger}$ is a Moore-Penmore (approximate) inverse of T and T is a Toeplitz matrix given by $$T_{(N+L)\times(M+L)} = \begin{bmatrix} x_0 & 0 & \cdots & 0 \\ x_1 & x_0 & \cdots & 0 \\ \cdot & \cdot & \cdot & \cdot \\ \cdot & \cdot & \cdot & \cdot \\ \cdot & \cdot & \cdot & \cdot \\ x_{M+L-1} & x_{M+L-2} & \cdots & x_0 \\ \cdot & \cdot & \cdot & \cdot \\ \cdot & \cdot & \cdot & \cdot \\ \cdot & \cdot & \cdot & \cdot \\ x_{N+L-1} & x_{N+L-2} & \cdots & x_{N+L-M} \end{bmatrix},$$

further wherein $x_n$, for n=0 to (N+L−1), is a finite sequence of sampled values of a reference test signal $X_{REF}$, wherein the reference test signal $X_{REF}$ comprises the test signal x uncorrupted by the communication channel, further wherein N equals the number of sampled values of the finite sequence of $x_n$, and still further wherein y is a finite sequence of sampled values of the received signal.

4. The method of communication channel identification according to claim 1, wherein said step of calculating the sequence of channel values further comprises generating a number of singular-value-decomposition (SVD) singular values and truncating an optimal number of SVD singular values to zero.

5. The method of communication channel identification according to claim 4, wherein truncating the optimal number of SVD singular values to zero comprises the steps of (i) truncating a first number of smallest singular values and then (ii) continuing to truncate an increasing number of smallest singular values until a minimum squared-estimation error (SE) of a performance of the LS estimator is obtained.

6. The method of communication channel identification according to claim 4, wherein truncating the optimal number of SVD singular values to zero comprises truncating singular values of less than $1 \times 10^{-4}$.

7. The method of communication channel identification according to claim 4, wherein calculating the sequence of channel values still further comprises using a least-squares (LS) estimator $\hat{h}_A$ given by $$\hat{h}_A = T^\dagger y,$$

where $T^\dagger$ is a Moore-Penmore (approximate) inverse of T and T is a Toeplitz matrix given by $$T_{(N+L)\times(M+L)} = \begin{bmatrix} x_0 & 0 & \cdots & 0 \\ x_1 & x_0 & \cdots & 0 \\ \cdot & \cdot & & \cdot \\ \cdot & \cdot & & \cdot \\ \cdot & \cdot & & \cdot \\ x_{M+L-1} & x_{M+L-2} & \cdots & x_0 \\ \cdot & \cdot & & \cdot \\ \cdot & \cdot & & \cdot \\ \cdot & \cdot & & \cdot \\ x_{N+L-1} & x_{N+L-2} & \cdots & x_{N+L-M} \end{bmatrix},$$

further wherein $x_n$, for n=0 to (N+L−1), is a finite sequence of sampled values of a reference test signal $X_{REF}$, wherein the reference test signal $X_{REF}$ comprises the test signal x uncorrupted by the communication channel, further wherein N equals the number of sampled values of the finite sequence of $x_n$, and still further wherein y is a finite sequence of sampled values of the received signal.

8. The method of communication channel identification according to claim 7, wherein truncating the optimal number of SVD singular values to zero comprises the steps of (i) truncating a first number of smallest singular values and then (ii) continuing to truncate an increasing number of smallest singular values until a minimum squared-estimation error (SE) of a performance of the LS estimator is obtained.

9. The method of communication channel identification according to claim 7, wherein truncating the optimal number of SVD singular values to zero comprises truncating singular values of less than $1 \times 10^4$.

10. The method of communication channel identification according to claim 4, wherein calculating the sequence of channel values still further comprises using a least-squares (LS) estimator $\hat{h}_B$ given by $$\hat{h}_B = (T^T T)^\dagger T^T y,$$

where $(T^T T)^\dagger T^T$ is approximately equal to $T^\dagger$, wherein $T^\dagger$ is a Moore-Penmore (approximate) inverse of T and T is a Toeplitz matrix given by $$T_{(N+L)\times(M+L)} = \begin{bmatrix} x_0 & 0 & \cdots & 0 \\ x_1 & x_0 & \cdots & 0 \\ \cdot & \cdot & & \cdot \\ \cdot & \cdot & & \cdot \\ \cdot & \cdot & & \cdot \\ x_{M+L-1} & x_{M+L-2} & \cdots & x_0 \\ \cdot & \cdot & & \cdot \\ \cdot & \cdot & & \cdot \\ \cdot & \cdot & & \cdot \\ x_{N+L-1} & x_{N+L-2} & \cdots & x_{N+L-M} \end{bmatrix},$$

further wherein $x_n$, for n=0 to (N+L−1), is a finite sequence of sampled values of a reference test signal $X_{REF}$, wherein the reference test signal $X_{REF}$ comprises the test signal x uncorrupted by the communication channel, further wherein N equals the number of sampled values of the finite sequence of $x_n$, and still further wherein y is a finite sequence of sampled values of the received signal.

11. The method of communication channel identification according to claim 10, wherein truncating the optimal number of SVD singular values to zero comprises the steps of (i) truncating a first number of smallest singular values and then (ii) continuing to truncate an increasing number of smallest singular values until a minimum squared-estimation error (SE) of a performance of the LS estimator is obtained.

12. The method of communication channel identification according to claim 10, wherein truncating the optimal number of SVD singular values to zero comprises truncating singular values of less than $1 \times 10^{-4}$.

13. An apparatus for communication channel identification comprising:

means for receiving a signal y, wherein signal y comprises a test signal x after test signal x has passed through a communication channel to be identified, test signal x having been transmitted over the communication channel and further having a signal span;

means for storing a reference test signal $X_{REF}$, wherein the reference test signal $X_{REF}$ comprises the test signal x uncorrupted by the communication channel; and means responsive to the received signal y and the reference test signal $x_{REF}$ for calculating a sequence of channel values corresponding to an estimated channel impulse response, the channel impulse response providing an estimate of the communication channel, wherein the sequence of channel values comprises a sampled discrete channel of a finite number of non-zero indices in an interval defined by [−L, M], wherein the channel impulse response has an impulse response span equal to M+L, the impulse response span being less than the span of the test signal x, wherein said calculating means further comprises a least-squares (LS) estimator.

14. The apparatus for communication channel identification according to claim 13, wherein the LS estimator of said calculating means comprises a LS estimator $\hat{h}_A$ given by $$\hat{h}_A = T^\dagger y,$$

where $T^\dagger$ is a Moore-Penmore (approximate) inverse of T and T is a Toeplitz matrix given by $$T_{(N+L)\times(M+L)} = \begin{bmatrix} x_0 & 0 & \ldots & 0 \\ x_1 & x_0 & \ldots & 0 \\ \cdot & \cdot & \cdot & \cdot \\ \cdot & \cdot & \cdot & \cdot \\ \cdot & \cdot & \cdot & \cdot \\ x_{M+L-1} & x_{M+L-2} & \ldots & x_0 \\ \cdot & \cdot & \cdot & \cdot \\ \cdot & \cdot & \cdot & \cdot \\ \cdot & \cdot & \cdot & \cdot \\ x_{N+L-1} & x_{N+L-2} & \ldots & x_{N+L-M} \end{bmatrix},$$

further wherein $x_n$, for n=0 to (N+L−1), is a finite sequence of sampled values of the reference test signal $X_{REF}$, further wherein N equals the number of sampled values of the finite sequence of $X_n$, and still further wherein y is a finite sequence of sampled values of the received signal.

15. The apparatus for communication channel identification according to claim 13, wherein the LS estimator of said calculating means comprises a LS estimator $\hat{h}_B$ given by $$\hat{h}_B = (T^T T)^\dagger T^T y,$$

where $(T^T T)^\dagger T$ is approximately equal to $T^\dagger$, wherein $T^\dagger$ is a Moore-Penmore (approximate) inverse of T and T is a Toeplitz matrix given by $$T_{(N+L)\times(M+L)} = \begin{bmatrix} x_0 & 0 & \ldots & 0 \\ x_1 & x_0 & \ldots & 0 \\ \cdot & \cdot & \cdot & \cdot \\ \cdot & \cdot & \cdot & \cdot \\ \cdot & \cdot & \cdot & \cdot \\ x_{M+L-1} & x_{M+L-2} & \ldots & x_0 \\ \cdot & \cdot & \cdot & \cdot \\ \cdot & \cdot & \cdot & \cdot \\ \cdot & \cdot & \cdot & \cdot \\ x_{N+L-1} & x_{N+L-2} & \ldots & x_{N+L-M} \end{bmatrix},$$

further wherein $x_n$, for n=0 to (N+L−1), is a finite sequence of sampled values of a reference test signal $x_{REF}$, further wherein N equals the number of sampled values of the finite sequence of $x_n$, and still further wherein y is a finite sequence of sampled values of the received signal.

16. The apparatus for communication channel identification according to claim 13, wherein said calculating means further comprises means for generating a number of singular-value-decomposition (SVD) singular values and means for truncating an optimal number of SVD singular values to zero.

17. The apparatus for communication channel identification according to claim 16, wherein the truncating means (i) truncates a first number of smallest singular values and then (ii) continues to truncate an increasing number of smallest singular values until a minimum squared-estimation error (SE) of a performance of the LS estimator is obtained.

18. The apparatus for communication channel identification according to claim 16, wherein the truncating means truncates singular values of less than $1\times10^{-4}$.

19. The apparatus for communication channel identification according to clain 16, wherein the LS estimator of said calculating means comprises a LS estimator $\hat{h}_A$ given by $\hat{h}_A = T^\dagger y,$ where $T^\dagger$ is a Moore-Penmore (approximate) inverse of T and T is a Toeplitz matrix given by $$T_{(N+L)\times(M+L)} = \begin{bmatrix} x_0 & 0 & \ldots & 0 \\ x_1 & x_0 & \ldots & 0 \\ \cdot & \cdot & \cdot & \cdot \\ \cdot & \cdot & \cdot & \cdot \\ \cdot & \cdot & \cdot & \cdot \\ x_{M+L-1} & x_{M+L-2} & \ldots & x_0 \\ \cdot & \cdot & \cdot & \cdot \\ \cdot & \cdot & \cdot & \cdot \\ \cdot & \cdot & \cdot & \cdot \\ x_{N+L-1} & x_{N+L-2} & \ldots & x_{N+L-M} \end{bmatrix},$$

further wherein $x_n$, for n=0 to (N+L−1), is a finite sequence of sampled values of a reference test signal $x_{REF}$, further wherein N equals the number of sampled values of the finite sequence of $x_n$, and still further wherein y is a finite sequence of sampled values of the received signal.

20. The apparatus for communication channel identification according to claim 19, wherein the truncating means (i) truncates a first number of smallest singular values and then (ii) continues to truncate an increasing number of smallest singular values until a minimum squared-estimation error (SE) of a performance of the LS estimator is obtained.

21. The apparatus for communication channel identification according to claim 19, wherein the truncating means truncates singular values of less than $1\times10^{-4}$.

22. The apparatus for communication channel identification according to claim 16, wherein the LS estimator of said calculating means comprises a LS estimator $\hat{h}_B$ given by $\hat{h}_B = (T^T T)^\dagger T^T y,$ where $(T^T T)^\dagger T^T$ is approximately equal to $T^\dagger$, wherein $T^\dagger$ is a Moore-Penmore (approximate) inverse of T and T is a Toeplitz matrix given by $$T_{(N+L)\times(M+L)} = \begin{bmatrix} x_0 & 0 & \ldots & 0 \\ x_1 & x_0 & \ldots & 0 \\ \cdot & \cdot & \cdot & \cdot \\ \cdot & \cdot & \cdot & \cdot \\ \cdot & \cdot & \cdot & \cdot \\ x_{M+L-1} & x_{M+L-2} & \ldots & x_0 \\ \cdot & \cdot & \cdot & \cdot \\ \cdot & \cdot & \cdot & \cdot \\ \cdot & \cdot & \cdot & \cdot \\ x_{N+L-1} & x_{N+L-2} & \ldots & x_{N+L-M} \end{bmatrix},$$

further wherein $x_n$, for n=0 to (N+L−1), is a finite sequence of sampled values of a reference test signal $X_{REF}$, further wherein N equals the number of sampled values of the finite sequence of $x_n$, and still further wherein y is a finite sequence of sampled values of the received signal.

23. The apparatus for communication channel identification according to claim 22, wherein the truncating means (i) truncates a first number of smallest singular values and then (ii) continues to truncate an increasing number of smallest singular values until a minimum squared-estimation error (SE) of a performance of the LS estimator is obtained.

24. The apparatus for communication channel identification according to claim 22, wherein the truncating means truncates singular values of less than $1\times10^{-4}$.

25. A method of removing channel-induced distortion from signals, said method comprising the steps of:

receiving the signals, wherein the signals include a signal y, further wherein signal y comprises a test signal x after test signal x has passed through and been distorted by a communication channel, test signal x having been transmitted over the communication channel and further having a signal span;

identifying the communication channel in real time, wherein said identifying step comprises calculating a sequence of channel values corresponding to an estimated channel impulse response, the channel impulse response providing an estimate of the communication channel, wherein the sequence of channel values comprises a sampled discrete channel of a finite number of non-zero indices in an interval defined by [−L, M], wherein the channel impulse response has an impulse response span equal to M+L, the impulse response span being less than the span of the test signal x, wherein calculating the sequence of channel values further comprises using a leastsquares (LS) estimator; and filtering the received signals in real time, in response to the sequence of channel values corresponding to the estimated channel impulse response, to remove channel-induced distortion from the signals.

26. The method of removing channel-induced distortion from signals according to claim 25, wherein calculating the sequence of channel values further comprises using a least-squares (LS) estimator $\hat{h}_A$ given by $$\hat{h}_A = T^\dagger y,$$

where $T^\dagger$ is a Moore-Penmore (approximate) inverse of T and T is a Toeplitz matrix given by $$T_{(N+L)\times(M+L)} = \begin{bmatrix} x_0 & 0 & \cdots & 0 \\ x_1 & x_0 & \cdots & 0 \\ \cdot & \cdot & & \cdot \\ \cdot & \cdot & & \cdot \\ \cdot & \cdot & & \cdot \\ x_{M+L-1} & x_{M+L-2} & \cdots & x_0 \\ \cdot & \cdot & & \cdot \\ \cdot & \cdot & & \cdot \\ \cdot & \cdot & & \cdot \\ x_{N+L-1} & x_{N+L-2} & \cdots & x_{N+L-M} \end{bmatrix},$$

further wherein $x_n$, for n=0 to (N+L−1), is a finite sequence of sampled values of a reference test signal $X_{REF}$, wherein the reference test signal $X_{REF}$ comprises the test signal x uncorrupted by the communication channel, further wherein N equals the number of sampled values of the finite sequence of $x_n$, and still further wherein y is a finite sequence of sampled values of the received signal.

27. The method of removing channel-induced distortion from signals according to claim 25, wherein calculating the sequence of channel values further comprises using a least-squares (LS) estimator $\hat{h}_B$ given by $$\hat{h}_B = (T^T T)^\dagger T^T y,$$

where $(T^T T)^\dagger T^T$ is approximately equal to $T^\dagger$, wherein $T^\dagger$ is a Moore-Penmore (approximate) inverse of T and T is a Toeplitz matrix given by $$T_{(N+L)\times(M+L)} = \begin{bmatrix} x_0 & 0 & \cdots & 0 \\ x_1 & x_0 & \cdots & 0 \\ \cdot & \cdot & & \cdot \\ \cdot & \cdot & & \cdot \\ \cdot & \cdot & & \cdot \\ x_{M+L-1} & x_{M+L-2} & \cdots & x_0 \\ \cdot & \cdot & & \cdot \\ \cdot & \cdot & & \cdot \\ \cdot & \cdot & & \cdot \\ x_{N+L-1} & x_{N+L-2} & \cdots & x_{N+L-M} \end{bmatrix},$$

further wherein $x_n$, for n=0 to (N+L−1), is a finite sequence of sampled values of a reference test signal $x_{REF}$, wherein the reference test signal $x_{REF}$ comprises the test signal x uncorrupted by the communication channel, further wherein N equals the number of sampled values of the finite sequence of $x_n$, and still further wherein y is a finite sequence of sampled values of the received signal.

28. The method of removing channel-induced distortion from signals according to claim 25, wherein calculating the sequence of channel values further comprises generating a number of singular-value-decomposition (SVD) singular values and truncating an optimal number of SVD singular values to zero.

29. The method of removing channel-induced distortion from signals according to claim 28, wherein truncating the optimal number of SVD singular values to zero comprises the steps of (i) truncating a first number of smallest singular values and then (ii) continuing to truncate an increasing number of smallest singular values until a minimum squared-estimation error (SE) of a performance of the LS estimator is obtained.

30. The method of removing channel-induced distortion from signals according to claim 28, wherein truncating the optimal number of SVD singular values to zero comprises truncating singular values of less than $1 \times 10^{-4}$.

31. The method of removing channel-induced distortion from signals according to claim 28, wherein calculating the sequence of channel values still further comprises using a least-squares (LS) estimator $\hat{h}_A$ given by $$\hat{h}_A = T^\dagger y,$$

where $T^\dagger$ is a Moore-Penmore (approximate) inverse of T and T is a Toeplitz matrix given by $$T_{(N+L)\times(M+L)} = \begin{bmatrix} x_0 & 0 & \cdots & 0 \\ x_1 & x_0 & \cdots & 0 \\ \cdot & \cdot & & \cdot \\ \cdot & \cdot & & \cdot \\ \cdot & \cdot & & \cdot \\ x_{M+L-1} & x_{M+L-2} & \cdots & x_0 \\ \cdot & \cdot & & \cdot \\ \cdot & \cdot & & \cdot \\ \cdot & \cdot & & \cdot \\ x_{N+L-1} & x_{N+L-2} & \cdots & x_{N+L-M} \end{bmatrix},$$

further wherein $x_n$, for n=0 to (N+L−1), is a finite sequence of sampled values of a reference test signal $X_{REF}$, wherein the reference test signal $X_{REF}$ comprises the test signal x uncorrupted by the communication channel, further wherein N equals the number of sampled values of the finite sequence of $x_n$, and still further wherein y is a finite sequence of sampled values of the received signal.

32. The method of removing channel-induced distortion from signals according to claim 31, wherein truncating the optimal number of SVD singular values to zero comprises the steps of (i) truncating a first number of smallest singular values and then (ii) continuing to truncate an increasing number of smallest singular values until a minimum squared-estimation error (SE) of a performance of the LS estimator is obtained.

33. The method of removing channel-induced distortion from signals according to claim 31, wherein truncating the optimal number of SVD singular values to zero comprises truncating singular values of less than $1\times10^{-4}$.

34. The method of removing channel-induced distortion from signals according to claim 28, wherein calculating the sequence of channel values still further comprises using a least-squares (LS) estimator $\hat{h}_B$ given by $$\hat{h}_B = (T^T T)^\dagger T^T y,$$

where $(T^T T)^\dagger T^T$ is approximately equal to $T^\dagger$, wherein $T^\dagger$ is a Moore-Penmore (approximate) inverse of T and T is a Toeptitz matrix given by $$T_{(N+L)\times(M+L)} = \begin{bmatrix} x_0 & 0 & \cdots & 0 \\ x_1 & x_0 & \cdots & 0 \\ \cdot & \cdot & & \cdot \\ \cdot & \cdot & & \cdot \\ \cdot & \cdot & & \cdot \\ x_{M+L-1} & x_{M+L-2} & \cdots & x_0 \\ \cdot & \cdot & & \cdot \\ \cdot & \cdot & & \cdot \\ \cdot & \cdot & & \cdot \\ x_{N+L-1} & x_{N+L-2} & \cdots & x_{N+L-M} \end{bmatrix},$$

further wherein $x_n$, for n=0 to (N+L−1), is a finite sequence of sampled values of a reference test signal $X_{REF}$, wherein the reference test signal $X_{REF}$ comprises the test signal x uncorrupted by the communication channel, further wherein N equals the number of sampled values of the finite sequence of $x_n$, and still further wherein y is a finite sequence of sampled values of the received signal.

35. The method of removing channel-induced distortion from signals according to claim 34, wherein truncating the optimal number of SVD singular values to zero comprises the steps of (i) truncating a first number of smallest singular values and then (ii) continuing to truncate an increasing number of smallest singular values until a minimum squared-estimation error (SE) of a performance of the LS estimator is obtained.

36. The method of removing channel-induced distortion from signals according to claim 34, wherein truncating the optimal number of SVD singular values to zero comprises truncating singular values of less than $1\times10^{-4}$.

37. An apparatus for removing channel-induced distortion from signals, said means for receiving the signals, wherein the signals include a signal y, further wherein signal y comprises a test signal x after test signal x has passed through and been distorted by a communication channel, test signal x having been transmitted over the communication channel and further having a signal span;

means for storing a reference test signal $x_{REF}$, wherein the reference test signal $X_{REF}$ comprises a copy of the test signal x uncorrupted by the comlmunication channel;

means responsive to the received signal y and the reference test signal $X_{REF}$ for identifying the communication channel in real time, wherein said identifying means comprises means for calculating a sequence of channel values corresponding to an estimated channel impulse response, the channel impulse response providing an estimate of the communication channel, wherein the sequence of channel values comprises a sampled discrete channel of a finite number of non-zero indices in an interval defined by [−L, M], wherein the channel impulse response has an impulse response span equal to M+L, the impulse response span being less than the span of the test signal x, wherein said calculating means further comprises a least-squares (LS) estimator; and means for filtering the received signals in real time, in response to the sequence of channel values corresponding to the estimated channel impulse response, to remove channel-induced distortion from the signals.

38. The apparatus for removing channel-induced distortion from signals according to claim 37, wherein the LS estimator of said calculating means comprises a LS estimator $\hat{h}_A$ given by $$\hat{h}_A = T^\dagger y,$$

where $T^\dagger$ is a Moore-Penmore (approximate) inverse of T and T is a Toeplitz matrix given by $$T_{(N+L)\times(M+L)} = \begin{bmatrix} x_0 & 0 & \cdots & 0 \\ x_1 & x_0 & \cdots & 0 \\ \cdot & \cdot & & \cdot \\ \cdot & \cdot & & \cdot \\ \cdot & \cdot & & \cdot \\ x_{M+L-1} & x_{M+L-2} & \cdots & x_0 \\ \cdot & \cdot & & \cdot \\ \cdot & \cdot & & \cdot \\ \cdot & \cdot & & \cdot \\ x_{N+L-1} & x_{N+L-2} & \cdots & x_{N+L-M} \end{bmatrix},$$

further wherein $x_n$, for n=0 to (N+L−1), is a finite sequence of sampled values of the reference test signal $X_{REF}$, further wherein N equals the number of sampled values of the finite sequence of $x_n$, and still further wherein y is a finite sequence of sampled values of the received signal.

39. The apparatus for removing channel-induced distortion from signals according to claim 37, wherein the LS estimator of said calculating means comprises a LS estimator $\hat{h}_B$ given by $$\hat{h}_B = (T^T T)^\dagger T^T y,$$

where $(T^T T)^\dagger T^T$ is approximately equal to $T^\dagger$, wherein $T^\dagger$ is a Moore-Penmore (approximate) inverse of T and T is a Toeplitz matrix given by $$T_{(N+L)\times(M+L)} = \begin{bmatrix} x_0 & 0 & \cdots & 0 \\ x_1 & x_0 & \cdots & 0 \\ \cdot & \cdot & \cdot & \cdot \\ \cdot & \cdot & \cdot & \cdot \\ \cdot & \cdot & \cdot & \cdot \\ x_{M+L-1} & x_{M+L-2} & \cdots & x_0 \\ \cdot & \cdot & \cdot & \cdot \\ \cdot & \cdot & \cdot & \cdot \\ \cdot & \cdot & \cdot & \cdot \\ x_{N+L-1} & x_{N+L-2} & \cdots & x_{N+L-M} \end{bmatrix},$$

further wherein $x_n$, for n=0 to (N+L−1), is a finite sequence of sampled values of a reference test signal $x_{REF}$, further wherein N equals the number of sampled values of the finite sequence of $x_n$, and still further wherein y is a finite sequence of sampled values of the received signal.

40. The apparatus for removing channel-induced distortion from signals according to claim 37, wherein said calculating means further comprises means for generating a number of singular-value-decomposition (SVD) singular values and means for truncating an optimal number of SVD singular values to zero.

41. The apparatus for removing channel-induced distortion from signals according to claim 40, wherein the truncating means (i) truncates a first number of smallest singular values and then (ii) continues to truncate an increasing number of smallest singular values until a minimum squared-estimation error (SE) of a performance of the LS estimator is obtained.

42. The apparatus for removing channel-induced distortion from signals according to claim 40, wherein the truncating means truncates singular values of less than $1\times10^{-4}$.

43. The apparatus for removing channel-induced distortion from signals according to claim 40, wherein the LS estimator of said calculating means comprises a LS estimator $\hat{h}_A$ given by $$\hat{h}_A = T^\dagger y,$$

where $T^\dagger$ is a Moore-Penmore (approximate) inverse of T and T is a Toeplitz matrix given by $$T_{(N+L)\times(M+L)} = \begin{bmatrix} x_0 & 0 & \cdots & 0 \\ x_1 & x_0 & \cdots & 0 \\ \cdot & \cdot & \cdot & \cdot \\ \cdot & \cdot & \cdot & \cdot \\ \cdot & \cdot & \cdot & \cdot \\ x_{M+L-1} & x_{M+L-2} & \cdots & x_0 \\ \cdot & \cdot & \cdot & \cdot \\ \cdot & \cdot & \cdot & \cdot \\ \cdot & \cdot & \cdot & \cdot \\ x_{N+L-1} & x_{N+L-2} & \cdots & x_{N+L-M} \end{bmatrix},$$

further wherein $x_n$, for n=0 to (N+L−1), is a finite sequence of sampled values of a reference test signal xRu, further wherein N equals the number of sampled values of the finite sequence of $x_n$, and still further wherein y is a finite sequence of sampled values of the received signal.

44. The apparatus for removing channel-induced distortion from signals according to claim 43, wherein the truncating means (i) truncates a first number of smallest singular values and then (ii) continues to truncate an increasing number of smallest singular values until a minimum squared-estimation error (SE) of a performance of the LS estimator is obtained.

45. The apparatus for removing channel-induced distortion from signals according to claim 43, wherein the truncating means truncates singular values of less than $1\times10^{-4}$.

46. The apparatus for removing channel-induced distortion from signals according to claim 40, wherein the LS estimator of said calculating means comprises a LS estimator $\hat{h}_B$ given by $$\hat{h}_B = (T^T T)^\dagger T^T y,$$

where $(T^T T)^\dagger T^T$ is approximately equal to $T^\dagger$, wherein $T^\dagger$ is a Moore-Penmore (approximate) inverse of T and T is a Toeplitz matrix given by $$T_{(N+L)\times(M+L)} = \begin{bmatrix} x_0 & 0 & \cdots & 0 \\ x_1 & x_0 & \cdots & 0 \\ \cdot & \cdot & \cdot & \cdot \\ \cdot & \cdot & \cdot & \cdot \\ \cdot & \cdot & \cdot & \cdot \\ x_{M+L-1} & x_{M+L-2} & \cdots & x_0 \\ \cdot & \cdot & \cdot & \cdot \\ \cdot & \cdot & \cdot & \cdot \\ \cdot & \cdot & \cdot & \cdot \\ x_{N+L-1} & x_{N+L-2} & \cdots & x_{N+L-M} \end{bmatrix},$$

further wherein $x_n$, for n=0 to (N+L−1), is a finite sequence of sampled values of a reference test signal $x_{REF}$, further wherein N equals the number of sampled values of the finite sequence of $x_n$, and still further wherein y is a finite sequence of sampled values of the received signal.

47. The apparatus for removing channel-induced distortion from signals according to claim 46, wherein the truncating means (i) truncates a first number of smallest singular values and then (ii) continues to truncate an increasing number of smallest singular values until a minimum squared-estimation error (SE) of a performance of the LS estimator is obtained.

48. The apparatus for removing channel-induced distortion from signals according to claim 46, wherein the truncating means truncates singular values of less than $1\times10^{-4}$.

\* \* \* \* \*